(12) United States Patent
Carrier et al.

(10) Patent No.: US 7,937,263 B2
(45) Date of Patent: May 3, 2011

(54) SYSTEM AND METHOD FOR TOKENIZATION OF TEXT USING CLASSIFIER MODELS

(75) Inventors: Jill Carrier, Dorchester, MA (US);
Alwin B. Carus, Waban, MA (US);
William F. Cote, Carlisle, MA (US);
John Dowd, Sudbury, MA (US);
Kathryn Del La Femina, Ashland, MA (US); Alan Frankel, Framingham, MA (US); Wensheng(Vincent) Han, Arlington, MA (US); Larissa Lapshina, Shirley, MA (US); Bernardo Rechea, Belmont, MA (US); Ana Santisteban, Somerville, MA (US); Amy J. Uhrbach, Needham, MA (US)

(73) Assignee: Dictaphone Corporation, Stratford, CT (US)

( * ) Notice: Subject to any disclaimer, the term of this patent is extended or adjusted under 35 U.S.C. 154(b) by 1133 days.

(21) Appl. No.: 11/001,654

(22) Filed: Dec. 1, 2004

(65) Prior Publication Data

US 2006/0116862 A1   Jun. 1, 2006

(51) Int. Cl.
*G06F 17/27* (2006.01)
*G06F 17/20* (2006.01)
(52) U.S. Cl. .................... 704/9; 704/1; 704/10
(58) Field of Classification Search .................. 704/1, 9, 704/260, 258
See application file for complete search history.

(56) References Cited

U.S. PATENT DOCUMENTS

| | | | | |
|---|---|---|---|---|
| 5,423,032 A | * | 6/1995 | Byrd et al. | 707/5 |
| 5,555,343 A | * | 9/1996 | Luther | 704/260 |
| 6,327,561 B1 | | 12/2001 | Smith et al. | |
| 6,996,529 B1 | * | 2/2006 | Minnis | 704/258 |
| 2002/0022956 A1 | * | 2/2002 | Ukrainczyk et al. | 704/9 |
| 2004/0148170 A1 | * | 7/2004 | Acero et al. | 704/257 |
| 2005/0065776 A1 | * | 3/2005 | Coden et al. | 704/10 |
| 2006/0116862 A1 | * | 6/2006 | Carrier et al. | 704/1 |

OTHER PUBLICATIONS

T. Strzalkowski and R. Brandow, A Natural Language Correction Model for Continuous Speech Recognition, *Proceedings of the Fifth Workshop on Very Large Corpora*, pp. 168-177, Aug. 1997; http://acl.ldc.upenn.edu/W/W97/W97-0117.pdf.

M. Rayner et al., Combining Knowledge Sources to Reorder N-Best Speech Hypothesis List, *Proceedings DARPA Speech and Natural Language Workshop*, 1994; http://acl.ldc.upenn.edu/H/H94/H94-1040.pdf.

(Continued)

*Primary Examiner* — Richemond Dorvil
*Assistant Examiner* — Douglas C Godbold
(74) *Attorney, Agent, or Firm* — Wolf, Greenfield & Sacks, P.C.

(57) ABSTRACT

The present invention pertains to a system and method for the tokenization of text. The featurizer may be configured to receive input text and convert the input text into tokens. According to one aspect of the invention, the tokens may include only one type of character, the characters selected from the group consisting of letters, numbers, and punctuation. The tokenizer may also include a classifier. The classifier may be configured to receive the tokens from the featurizer. Furthermore, the classifier may be configured to analyze the tokens received from the featurizer to determine if the tokens may be input into a predetermined classification model using a preclassifier. If one of the tokens passes the preclassifier, then the token is classified using the predetermined classification model. Additionally, according to a first aspect of the invention, the tokenizer may also include a finalizer. The finalizer may be configured to receive the tokens and may be configured to produce a final output.

14 Claims, 12 Drawing Sheets

OTHER PUBLICATIONS

M. Ostendorf et al., Integration of Diverse Recognition Methodologies through Reevaluation of N-Best Sentence Hypotheses, *Proceedings of DARPA and Natural Language Workshop*, 1991; http://acl.ldc.upenn.edu/H/H91/H91-1013.pdf.

L. Norton et al., Recent Improvements and Benchmark Results for the Paramax ATIS System, *Proceedings of DARPA Workshop on Speech and Natural Language*, 1992; http://acl.ldc.upenn.edu/H/H92/H92-1017.pdf.

L. Hirschman, The Roles of Language Processing in a Spoken Language Interface, *Voice Communication Between Humans and Machines*, National Academy of Sciences, 1994, pp. 217-237; http://www.pnas.org/cgi/reprint/92/22/9970.

R. C. Moore, Integration of Speech with Natural Language Processing, *Voice Communication Between Humans and Machines*, National Academy of Sciences, 1994, pp. 254-271; http://www.pnas.org/cgi/reprint/92/22/9983.

J. Kupiec, Probabilistic Models of Short and Long Distance Word Dependencies in Running Text, *Proceedings of DARPA Speech and Natural Language Workshop*, 1992, pp. 290-295; http://acl.ldc.upenn.edu/H/H89/H89-1054.pdf.

H. Murveit and R. Moore, Integrating Natural Language Constraints into HMM-Based Speech Recognition, IEEE, 1990, pp. 573-576.

G. Maltese and F. Mancini, An Automatic Technique To Include Grammatical and Morphological Information in a Trigram-Based Statistical Language Model, *IEEE International Conference on Acoustics, Speech, and Signal Processing*, 1992, pp. 157-160.

R. Schwartz et al., On Using Written Language Training Data for Spoken Language Modelling, *Proceedings of Human Language Technology Workshop*, Morhan Kaufmann Publishers, Inc., 1994, pp. 94-98; http://acl.ldc.upenn.edu/H/H94/H94-1016.pdf.

E. K. Ringger and J. F. Allen, Error Correction via a Post-Processor for Continuous Speech Recognition, *In Proc. Of ICASSP-96, IEEE-96*, 1996.

A. V. Aho, R. Sethi, and J. D. Ullman, *Compilers*, Addison-Wesley Publ. Co., 1986, 1988, Ch. 3, pp. 83-158.

G. Greffenstette and P. Tapanainen, What Is a Word, What Is a Sentence? Problems of Tokenization, $3^{rd}$ *Conference on Computational Lexicography and Text Research, COMPLEX '94*, Budapest, Jul. 7-10, 1994.

M. D. Riley, Some Applications of Tree-Based Modelling To Speech and Language Indexing, *Proceedings of the DARPA Speech and Natural Language Workshop*, Morgan Kaufman, 1989, pp. 339-352.

D. D. Palmer, Satz—An Adaptive Sentence Segmentation System, *M.S. Thesis and UC-Berkeley Technical Report UCB/CSD 94/846*, University of California, Berkeley, Computer Science Division, 1994.

J. C. Reynar and A. Ratnaparkhi, A Maximum Entropy Approach to Identifying Sentence Boundaries, *Proceedings of the Fifth Conference on Applied Natural Language Processing*, Washington D.C., 1997, pp. 16-19.

D. D. Palmer and M. A. Hearst, Adaptive Multilingual Sentence Boundary Disambiguation, *Computational Linguistics*, 23(2), 1997.

A. Mikheev, Tagging Sentence Boundaries, *NACL 2000* (Seattle) ACL Apr. 2000, pp. 264-271.

H. Schmid, Unsupervised Learning of Period Disambiguation for Tokenisation, Internal Report, IMS, University of Stuttgart, Apr. 2000.

D. Yarowsky, Homograph Disambiguation In Text-To-Speech Synthesis, *Process In Speech Synthesis*, J. van Santen, R. Sproat, J. Olive, and J. Hirschberg (eds.), Springer-Verlag, 1996, pp. 159-175.

D. Yarowsky, Decision Lists for Lexical Ambiguity Resolution: Application to Accent Restoration in Spanish and French, *Proceedings of the $32^{nd}$ Annual Meeting of the Association for Computational Linguistics*, Las Cruces, NM, 1994, pp. 88-95.

D. Yarowsky, A Comparison of Corpus-Based Techniques for Restoring Accents in Spanish and French Text, *Proceedings, $2^{nd}$ Annual Workshop on Very Large Corpora*, Kyoto, 1994, pp. 19-32.

R. Sproat, Multilingual Text Analysis for Text-To-Speech Synthesis, *ECAI Workshop on Extended Finite-State Models of Language*, Aug. 1996, 1996.

R. Sproat, A. W. Black, S. Chen, S. Kumar, M. Ostendorf, and C. Richards, Normalization of Non-Standard Words: WS '99 Final Report, Sep. 13, 1999, pp. 1-78, In *Computer Speech and Language*, 15(3), 2001, pp. 287-333.

Daelemans, Walter et al., TiMBL: Tilburg Memory-Based Learner Reference Guide, Nov. 26, 2003, pp. 1-51, Tilburg University and CNTS Research Group, University of Antwerp.

* cited by examiner

B 12 Vitamin
B 12 vitamin
B-12 vitamin
B-12 Vitamin
B.12
B.12*
B12*
B-12
B-12*
B 12

FIG. 6A

United States*

SYSTEM AND METHOD FOR TOKENIZATION OF TEXT USING CLASSIFIER MODELS

FIELD OF THE INVENTION

The present invention relates generally to a system and method for manipulating and/or recognizing text. More particularly, the present invention relates to a system and method for tokenization of input text.

BACKGROUND OF THE INVENTION

When spoken words are dictated, they may be converted into text using various software applications. Components of these software applications may take input text and may manipulate that input text. The goal of this process is to attempt to turn spoken words into a final written document with as few errors as possible. A wide variety of terminology must be recognizable. In one particular field, for example, medicine, doctors or other practitioners may be dictating, for example, patient records. These doctors or medical practitioners may practice medicine in a wide variety of specialties ranging from radiology to mental health.

Speech recognition, in its most simple form, identifies the elementary units of input text. These elementary units may be called tokens, which are part of a larger string of text. Typically speech recognition systems need to be "trained" to recognize text and therefore, to properly implement a speech recognition system, it is desirable to define these tokens as accurately as possible. If the tokens are improperly defined, there may be errors in the recognition of the text, resulting in a bad "translation" of the text.

A major component in speech recognition systems is the tokenizer. Generally speaking, a tokenizer is a component in a speech recognition system that receives input text, which may be, for example, in human-readable form, and matches that input text to a particular lexicon or language model ("LM"). Tokenizers generally cannot use audio input; therefore, a tokenizer must use other means to hypothesize the tokens that were dictated to produce the output text. Thus, a tokenizer may have the ability to draw distinctions among separate usages of text. One possible problem with tokenizers is that various tokens in the output text may have any of the following characteristics: (1) different spellings from terms used in the language model (e.g., "w/o" versus "without"); (2) numeric forms (e.g., "2" versus "two"); (3) multiple different spellings in the LM (i.e., variant token forms such as "grey" versus "gray"); (4) boundaries that do not correspond to the component tokens; and (5) internal punctuation (e.g., "obstetrics/gynecology"). For example, a tokenizer may be configured to draw distinctions between various uses of the abbreviation "St.". On one hand, the abbreviation "St." may be used as an abbreviation of the word "saint". On the other hand, the abbreviation "St." may be used as an abbreviation of the word "street". A tokenizer may be configured to make a distinction between the two usages of the same string of text.

Development of a tokenizer, however, can be very complex and tedious. In order to develop a competent tokenizer, the tokenizer needs to have substantial contextual information regarding the input text. Because the given lexicon for a particular language model is finite, there is an inherent problem creating a tokenizer that can assist in accurately identifying particular strings of characters, such as, for example, words, numbers, abbreviations, or acronyms. In reality, in everyday speech individuals use the lexicon in a manner such that variants of the terms in the lexicon are potentially infinite. That is, one problem that arises is that a finite set of tokens are utilized to define an open set of tokens that may appear in everyday usage.

Currently, tokenizers are rule-based programs. This means that programmers write individual code-like rules to address various usages or various combinations of a string of text. For example, one example of a rule-based operation for a tokenizer may include a line of code that instructs the tokenizer to recognize that a three-digit number preceded by white-space and followed by a hyphen is part of a phone number or a social security number. Additionally, the code may also include an instruction that instructs the tokenizer that if the hyphen is followed by two digits and another hyphen it is a social security number, whereas if it includes two numbers followed by another number, then it is a phone number. The complexity of a rule-based system becomes readily apparent when looking at this simple example. Many of these tokenizers will require multiple lines of code to recognize each token. Debugging these rule-based tokenizers is extremely tedious. Updating the tokenizers or adding to the lexicon also becomes quite tedious.

Modern tokenizers may simply receive input text and look at the string of characters that are included as part of the input string. Then the tokenizer will run through its various rules in an attempt to classify the particular token in question. Some tokenizers may then output a variety of different possible output tokens. For example, two or three possible output tokens may be produced. These tokenizers, however, may fail to select a "best" token or candidate, or may select the incorrect token.

The present invention seeks to solve some of these shortcomings of prior art systems by utilizing a data-driven empirical tokenizer rather than the rule-based tokenizers. Such a data-driven empirical tokenizer can be achieved by implementing the various embodiments of the invention described herein.

SUMMARY OF THE INVENTION

The present invention includes a system, method and apparatus for tokenizing text. The tokenizer may include three components: (1) a featurizer, which parses text into a set of tokens and features that can be read as input by a classifier; (2) a classifier, which may be configured to call predetermined classification models to thereby assign categories to the tokens; and (3) a finalizer, which uses the tokens and categories to produce a final output.

The invention according to a first aspect is a tokenizer that may include a featurizer. The featurizer may be configured to receive input text and convert the input text into candidate tokens. According to one aspect of the invention, a given token may include only one type of character: letters, numbers, or punctuation. The tokenizer may also include a classifier. The classifier may be configured to receive the candidate tokens from the featurizer. Furthermore, the classifier may be configured to analyze the candidate tokens received from the featurizer to determine whether the candidate tokens may be input into a predetermined classification model using a preclassifier. If one of the candidate tokens passes the preclassifier, then it is classified using the predetermined classification model. The classification of the token may be stored in association with that token. In one embodiment of the invention, the classification associated with the token may be stored in a token structure. Additionally, according to a first aspect of the invention, the tokenizer may also include a finalizer. The finalizer may be configured to receive the tokens and may be configured to produce a final output.

The invention according to a second aspect may include a method of tokenizing input text. The method according to this second aspect of the present invention may include receiving an input string of text. This input string of text may be separated into tokens. In one embodiment of the invention, the tokens may include only one type of character: letters, numbers, or punctuation. According to another embodiment of the invention, these tokens may be associated with a token structure, the token structure including information related to attributes of the token. In yet another embodiment of the invention, the token may be a set of characters. The method according to the second aspect of the present invention may also include initializing a predetermined model, the predetermined model being configured to classify text. The method may also include receiving the tokens into a classifier and determining a classification of the tokens. The method may include storing the classification so that the classification is associated with the token. Finally, the method may include receiving the token, including associated classification data, into a token finalizer, and outputting finalized tokens.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 6 shows an example of two connected token candidates according to one aspect of the present invention;

FIG. 8C shows a flow diagram of the steps that may be performed by the finalizer 70, as shown in FIG. 1 according to one aspect of the present invention in the Coin-Toss Mode;

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Figure 1:
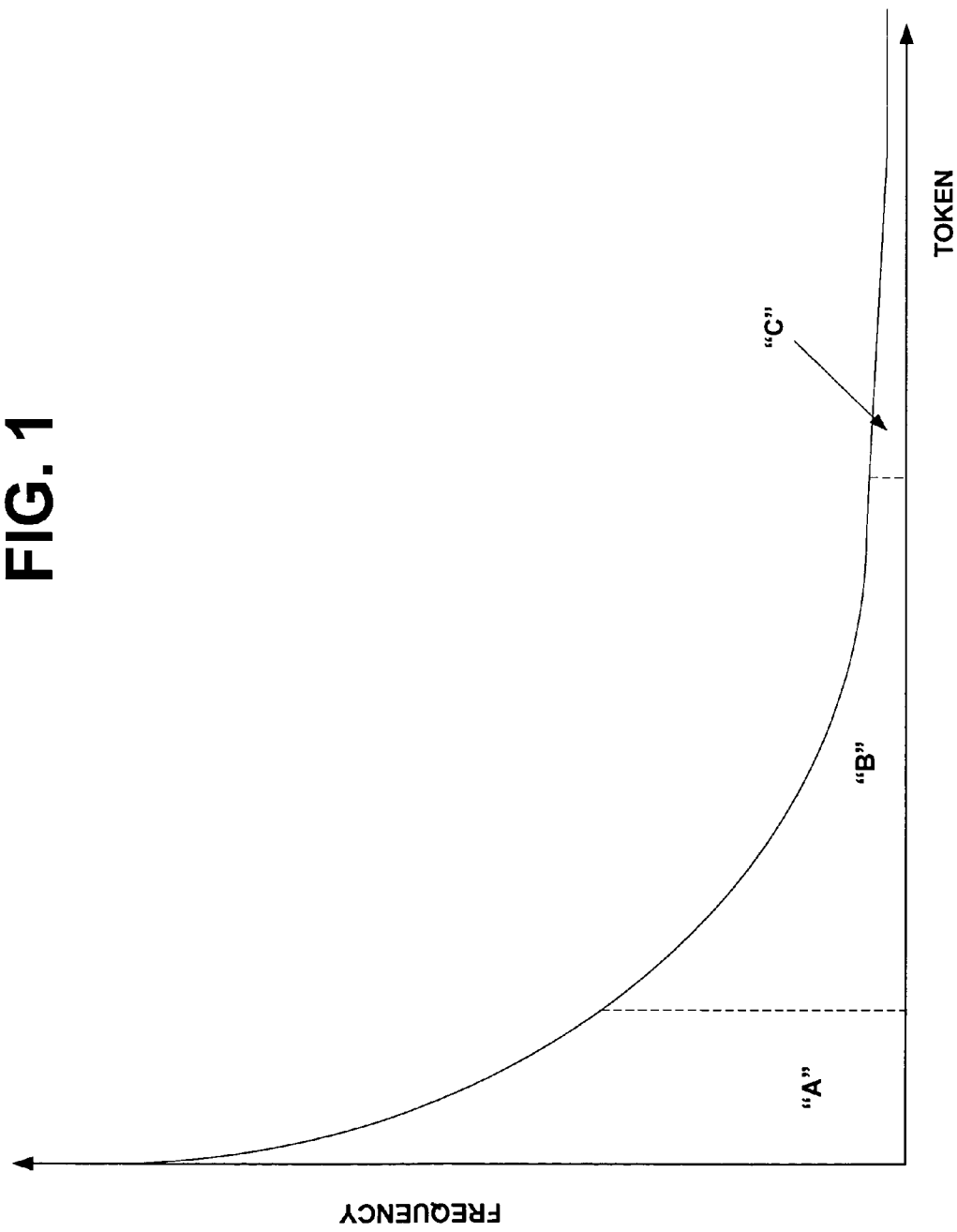
FIG. 1 shows a graphical representation of the Hapax Legomenon principle.

FIG. 1 is a graphical representation of the Hapax Legomenon principle. Specifically, this graph illustrates the problem that programmers face when developing speech recognition programs and more specifically tokenizers. As illustrated in FIG. 1, the x-axis on the graph represents all of the possible tokens and representations that may appear in text. This list is virtually infinite. The y-axis on the graph indicates the frequency with which a given token is found in usage. For example, tokens such as "a", "an", and "the" would occur very often in usage and therefore, these would appear in zone "A" illustrated in FIG. 1. Other words such as days of the week, the months, common names, and the like may occur with less regularity than the common words in zone "A", and may be located, for example, in zone "B". Additionally, obscure words such as "antidisestablishmentarianism" or "haemathermal" or "sexenary" may occur very far out on the x-axis. These words would appear in zone "C" on the plot in FIG. 1. There are, of course, more than mere words on the axis of possible tokens. For example, various numbers, such as years may also appear on the x-axis. Additionally combinations of words and letters, such as "B12", may also appear on the x-axis. As the lexicon becomes more and more robust, the number of possible tokens increases. There may be one billion, one trillion or even more possible tokens. The system and method for the tokenization of text according to the present invention has the ability to effectively truncate the asymptotical progression of the curve shown in FIG. 1 along the x-axis without sacrificing accuracy of the system.

Figure 2:
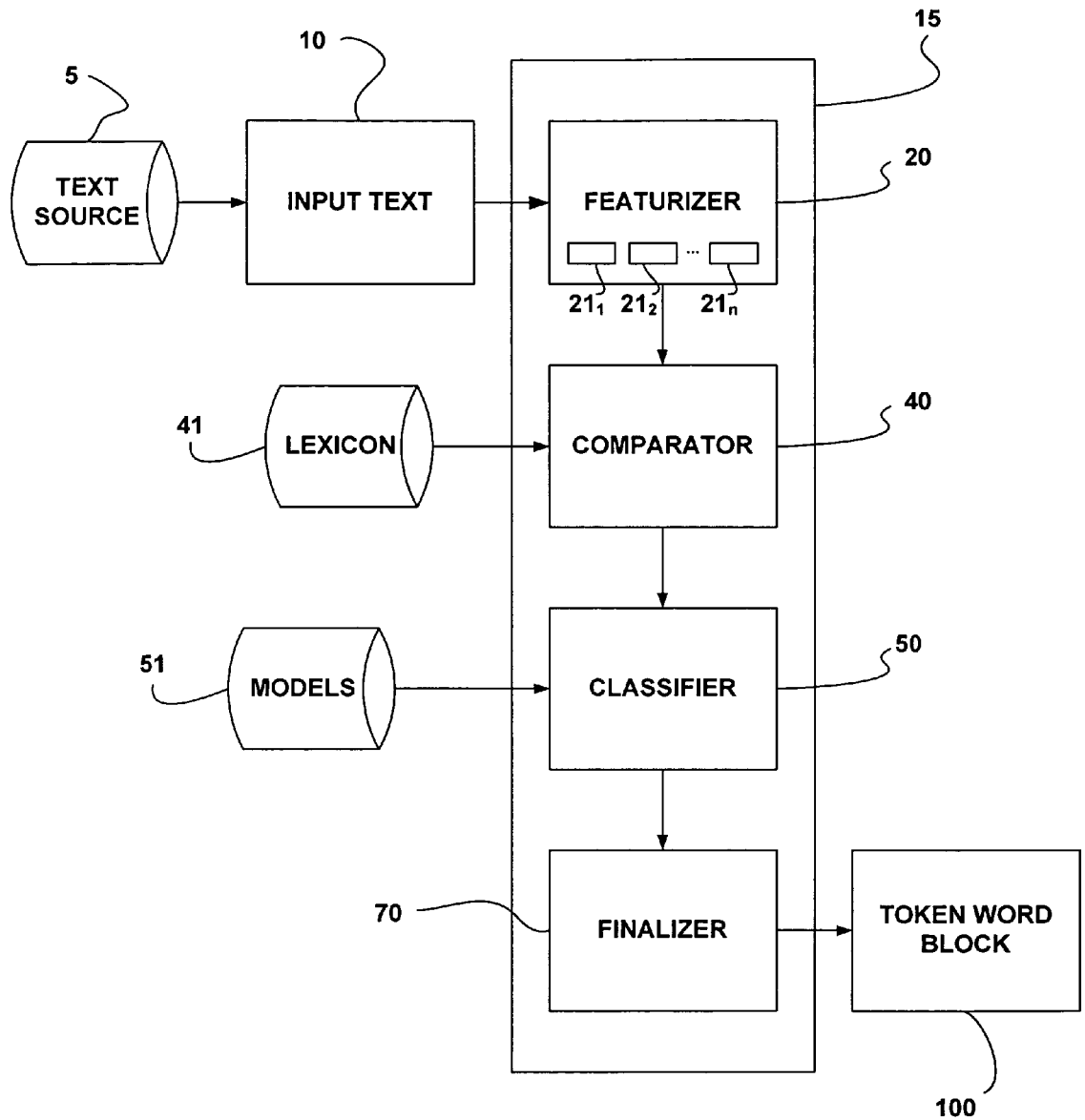
FIG. 2 shows an overview of the architecture of the system and method according to one aspect of the present invention.

FIG. 2 shows an overview of the architecture of the system and method for the tokenization of text according to one aspect of the present invention. FIG. 2 shows an exemplary embodiment of a tokenizer structure according to an embodiment of the invention. Input text 10 may be received into the tokenizer 15. In the embodiment illustrated in FIG. 2, the input text 10 may be, for example, "stage IV cancer.". This input text 10 may take the form of either text from a text document or may take the form of speech input directly into the tokenizer after being converted into an electrical signal by a speech input peripheral. Input text 10 may be readable by a human. A text source 5 is indicated in FIG. 2 as being the source of the input text 10 to be tokenized by the tokenizer 15. In one embodiment, a relatively short string of input text 10 may be tokenized. Alternatively, the tokenizer 15 may tokenize a string of any length. For example, a single word or string of numbers may be tokenized. Alternatively, an entire sentence, paragraph or document may be tokenized.

After the input text 10 is input into the tokenizer 15, a token list may be built by featurizer 20. A token list may be, for example, a central store of data that is to be tokenized. In one embodiment of the invention, the general purpose of the featurizer 20 is to break the input text 10 into the smallest meaningful unit of text from the input text 10. This may include featurizing a string of input text 10 into a set of character sequences and corresponding attributes. In one embodiment, the token list may be, for example, a list of memory based learning ("MBL") tokens. Thus, the input text 10 may be converted into an array of token structures, $21_1$, $21_2$, $21_3$. In the embodiment illustrated in FIG. 2, token structure $21_1$ may be, for example, the string "stage"; token structure 21₂ may be, for example, the string "IV"; token structure 21₃ may be, for example, the term "cancer", which ends with a period. In the illustrated embodiment, each token structure is a word, although this does not have to be the case.

Each token structure may be, for example, the smallest meaningful unit of text from the input text 10. A token structure may be, for example, a string of letters, digits or punctuation. Thus, in one embodiment, token structures may be parsed based on the transition of, for example, letters to numbers, letters to white-space, or numbers to white-space. Token structures may have a dressing, which is for example, a string of letters followed by a period or a comma. Alternatively, a token structure may have no dressing. The various attributes corresponding to the input text may be included in the token structure. Additionally, token structures may include some termination. For example, a token structure may be terminated with a space, a new line, or a tab. Alternatively, a token structure may have no termination, as would be the case with the input text 10, "B12", where the token structures would be "B" and "12" with no termination between the two token structures. One example of terminations for tokens are illustrated in FIG. 2.

Figure 3A:
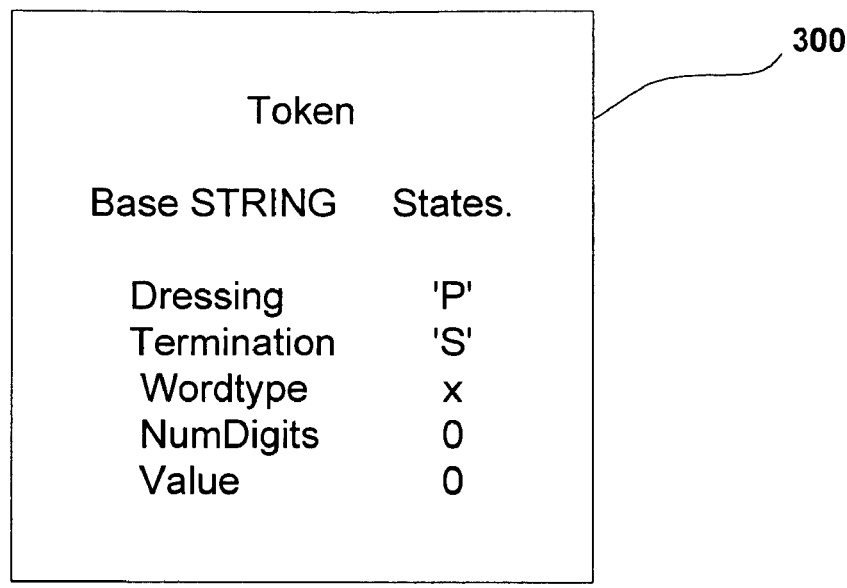
FIGS. 3A and 3B illustrate examples of token structures according to various aspects of the present invention.
Figure 3B:
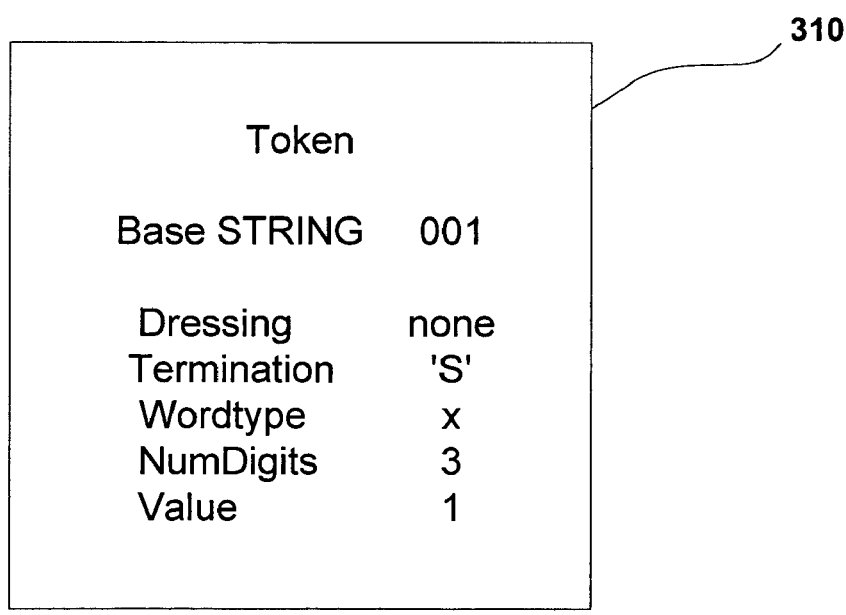

Referring now to FIGS. 3A and 3B, there are shown graphical representations of exemplary token structures that may be used in connection with the present invention. FIG. 3A illustrates a first token 300. In this example, the input text 10 may have been, for example, the text "United States.". Token 300 is the token corresponding to the word or base string "States.". In this example, the dressing is a period. In the graphical representation of a token illustrated in FIG. 3A, this period is connoted by a "P". The termination is a space. Thus, in FIG. 3A, this is designated with the letter "S". In the token "States.", there are no digits and therefore, both the number of digits ("NumDigits") and the value are both zero.

FIG. 3B illustrates another exemplary token 310. This is the graphical representation of the token for the base string "001". As illustrated in FIG. 3B, there is no dressing. This is connoted in FIG. 3B by the term "none". Additionally, the termination is a space, and therefore, similar to the example illustrated in FIG. 3A, an "S" is indicated in the token structure 310. In the example illustrated in FIG. 3B, there are 3 digits that appear in the numerical sequence "001". Thus, the value in the "NumDigits" field is "3". Finally, the value of "001" is one (1), and therefore, this value is associated with the "Value" field in the graphical representation of the token illustrated in FIG. 3B.

Referring back to FIG. 2, after the list of tokens has been constructed, the tokenizer 15 may be configured to perform a comparison of the individual token structures to the language model (LM) lexicon 41 in the comparator 40 of the tokenizer 15. Thus, each token structure may be looked up in the lexicon 41 to determine if the lexicon 41 contains that particular token structure. The tokenizer may also be configured to determine if a particular token is part of a multi-word string. For example, if a first token is the word "United" and a second token is the word "States", the tokenizer 15 may determine, in stage 40, that the first token and the second token together form a single match, "United States". This will depend on the words that are in the particular lexicon 41. For example, in one embodiment, the lexicon may be configured to find multiple word strings from a sequence of token structures so as to recognize "San Francisco Fire Department" as a single token in the lexicon. In yet another embodiment, connected token structures, such as, for example, "B12" may also be recognized as a single word even though it may include two token structures, as described above. This process may be repeated for each of the individual token structures that were constructed in stage 20.

After the tokenizer 15 performs the comparison of the tokens to the lexicon 41 using the comparator 40, the classifier 50 may be run. The classifier 50 may receive the token structures. A second input to the classifier 50 may include, for example, a number of predetermined models 51. These models 51 may be developed, for example, during a training session. In one embodiment, multiple models 51 may be input into the classifier 50. In another embodiment, a single model 51 may be input into the classifier 50. One model may be used to classify, for example, numbers, while another model may be used to distinguish the abbreviation "IV" (for "intravenous") from the Roman numeral "IV". Yet another example of a model may include a model for distinguishing between the abbreviation "St." for "saint" and "St." for "street". Another example of a classification model may be configured to distinguish between various uses of "MS". Possible uses of MS may include "multiple sclerosis", "master of science", "Mississippi", "millisecond" or "Ms.". A classification model may be designed to distinguish between these various uses of the abbreviation "MS". Prior to performing a classification using the classifier 50, the model database may need to be initialized. Thus, in one embodiment, at the startup of the program, the models may be read from the model database 51 into the classifier module 50. In an alternative embodiment, the user may determine which models to upload to the classifier model from the model database 51. In yet another embodiment, the software may automatically upload one or more models from the model database 51 into the classifier 50 automatically upon startup of the program.

This classifier 50 may, in some embodiments, include a number of substages or subroutines. For example, a first step may include reading from a configuration file to determine what set of features from a universe of features the classifier may utilize. In an alternative embodiment, the first step may include employing a filtering process to determine which individual model, if any, may need to be run on a particular token or group of tokens. For example, if the token is "IV" then the filtering would determine that the trained model that will be used on the token is the model for distinguishing between the Roman numeral IV (pronounced as "four") and the abbreviation IV (pronounced as the letters "I V"). Next, a configuration file may be read. The configuration file may be read to permit the classifier 50 to build the appropriate set of features to perform the classification. In one embodiment, these features may be derived from the token using a module called a feature formatter. After the appropriate classification file has been read from, the classifier 50 may then run the appropriate classification model on the token to be classified. Therefore, by the time the information exits from the classifier, all of the tokens that passed the filtering may be classified and a classified token list may be generated.

This list of classified tokens may then be passed on to a finalizer 70, which may read all of the resulting information produced by the preceding stages. Generally, the finalizer 70 reads all of the information from the preceding steps and may produce a final "answer" to be output from the tokenizer 15. More specifically, the finalizer determines the final token word block content. The final output of the tokenizer 15 is illustrated as the token word block 100. This data may be written in a predetermined form in which each sub-block may contain the token, the length of the token, and the lexicon in which the token was found (active or background).

In one embodiment of the present invention, the tokenizer 15 may include code to call up an external classification program. For example, the tokenizer 15, and more specifically, the classifier 50 may call upon third-party software to perform some or all of the classification processes. In one embodiment of the invention, the tokenizer 15 may be configured to call up a package known as TiMBL (Tilburg Memory Based Learner). The tokenizer 15 may be configured to classify input based on a feature set. In one embodiment of the invention, the format of the input, the feature set, and the classification may be specified by the user. In other embodiments of the invention, only some of the aforementioned features may be specified by the user.

In one embodiment of the invention the classifier 50 may be configured to develop user-specified models. Classifier 50 may be configured to receive inputs along with corresponding classifications. As used by the tokenizer, inputs may include, for example, tokens from the output text. Additionally, features may include, for example, specific information relevant to a particular input base string, such as, for example, whether the input string is followed by punctuation. Classifications may include a variety of different categories, such as, for example, "systolic blood pressure". In yet another embodiment of the present invention, the classifier may be used to spot and correct errors in the input text.

The steps to add a new classification for use by the classifier 50 will now be described. First a classification, or the need for a classification, may be recognized. Classifications are useful when the surface representation of a token in the finished text is insufficient to determine how the text was dictated. For example, a user may recognize that, without a classifier model, the tokenizer is unable to distinguish between "IV" dictated as "four" and "IV" dictated as "I V". Thus, a classifier model for "IV" may improve accuracy in terms of matching the original pronunciation. After the user has determined that a model may be useful, the user may collect the relevant data to develop the model. After the data has been collected, it may be divided into separate files according to classification. After this sorting has been performed, the algorithm may be developed. In one embodiment, the development of the algorithm may include the development of a prefilter, as described in reference to FIG. 7. The development of the algorithm may also include the selection of a feature set.

The relevant data to gather here are examples of "IV" being used in text reports. The data should consist of examples of the word "IV", with a few words of context to either side of the target word. The data for this example could consist of a file with 10,000 examples of the word "IV" from medical reports, one per line, with 40 characters of context on either side of the word "IV". This single file with 10,000 examples would then be split up into three files, say IVintravenous.txt with 6500 examples of "IV" as intravenous, IVfour.txt with 3000 examples of "IV" as four, and IVthefourth.txt, with 500 examples of "IV" as "the fourth".

The set of features depends on which relative token positions to get features from, and which features to get from each position. One may include the tokens from three tokens before the target token to three tokens after the target token, using all available features for each token position, as shown in FIGS. 3A and 3B. Tests are then run to see which features can be removed without causing unacceptable accuracy loss. An appropriate feature set is large enough to yield good accuracy, but small enough to load and run quickly.

After the feature set has been selected, a model may be built for the classification. This classification model may then be added to a configuration file for the overall classification model. The configuration file may specify data for each model, such as which features are used for each relative token position, and data for the preclassifier. Additionally, code associated with the classification may be added to the relevant classifier 50 file structure so that the classifier 50 may be able to determine the appropriate classification for a particular input string, as well as determine the appropriate candidate tokens for an input sting. Finally, the code associated with the finalizer 70 may be modified so that the finalizer 70 may be configured to handle the new classification.

A classifier 50 that may be configured to spot and correct errors may be configured to recognize a number of error patterns and correct the errors automatically. For example, if the automatic speech recognizer commonly misrecognizes "test scan" as "test skin", the classifier 50 may be configured to learn when "test scan" would be the correct output. In this case, the classification may be passed to a "recognition finalizer" (not illustrated) component that may be configured to change the term "test skin" to "test scan".

Figure 4:
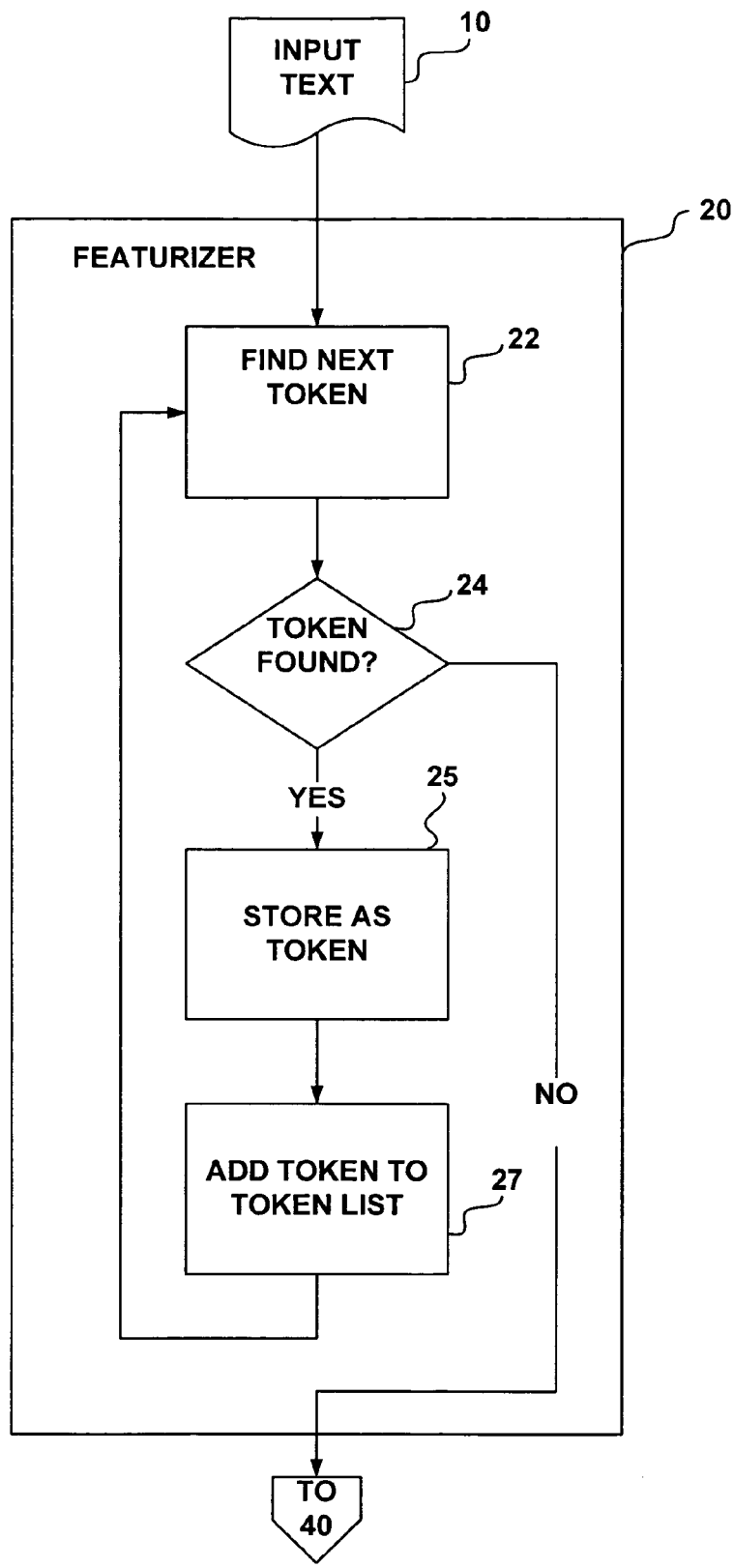
FIG. 4 shows a flow diagram of the steps that may be performed by the featurizer 20, as shown in FIG. 1 according to one aspect of the present invention.

FIG. 4 shows steps that may be performed by the featurizer 20, which constructs a list of tokens for further processing by the tokenizer 15. While FIG. 4 illustrates one method for constructing a list, other methods may be readily used to construct a list of tokens.

The input text 10 from, for example, a text document may be input into the featurizer 20. As described above, the featurizer may receive the input text 10 and may break the input text 10 into, for example, its smallest meaningful group of characters. In the most simple embodiment of the present invention, the featurizer may be configured to break up input text 10 such that whenever there is a transition between numerals, alphabetical characters, or white-space (e.g., tabs, spaces, new line), a new token may be recognized. Input text 10 may be broken up into any set of character sequences and/or attributes, if desired.

The featurizer 20 includes a step of finding the next token 22. This step reviews the input text 10, character by character. In the most simple embodiment, each time there is a transition between one type of character and another type of character a new token is recognized. For example, assume that the input string is "B12". The step of finding the next token may read the first character "B" and may call for a mode that would recognize alphabetical characters as the constituents of the token. Next, the step of finding the next token may review the second character and may realize that the second character is a "1". Realizing that "1" is not within the set of alphabetical characters, the first token identified may be identified as "B".

Thus, at decision block 24, the featurizer 20 may realize that a token has in fact been found and may store the token structure, step 25. Exemplary token structures are illustrated in FIGS. 3A and 3B. Thus, the token "B" may be stored, step 25, in a similar data structure as the string "States." was in FIG. 3A.

After storing the token structure, step 25, the token may be added to the token list. In the example above, if "B12" was the first portion of the input text 10, then the token "B" may be the first token added to the list. If "B12" came subsequent to other tokens, the token for "B" may be added to the end of the token list, step 37. After the token has been added to the token list, step 27, then the featurizer 20 may loop back to step 22 to look for another token. Here, the step of finding the next token 22 will recognize that the first character is a "1" and may instruct the featurizer 20 to use, for example, the numerals mode. The second character that the featurizer will see is a "2". The third position may include white-space, thus marking the end of the token. The token "12" may then be stored and added to the list of tokens. After all of the tokens have been found by the featurizer 20, the loop may terminate and the featurizer 20 may output the token list to the comparator 40.

Although embodiments of the invention have been described in which the tokenizer 15 and specifically the featurizer 20 break up tokens based on transitions from, for example, letters to numbers, or from letters to white-space, or letters to punctuation, more complex tokens may be constructed based on predetermined rules. For example, the featurizer 20 may be configured to identify tokens that have contractions, or tokens that have periods or other punctuation in them. For example, using the most simple embodiment described above, the tokenization of the acronym "I.B.M." is "I.", "B." and "M.". However, the tokenizer 15 may be configured such that the token for the acronym "I.B.M." is recognized as a complete acronym and thus identifies the complete token "I.B.M.".

In yet another embodiment, the storing step 25 may be performed at a different stage of the processing. Storing the string of information flagged as a token in a token structure as illustrated in FIGS. 3A and 3B may be performed, for example, immediately before the data is input into the classifier.

Figure 5:
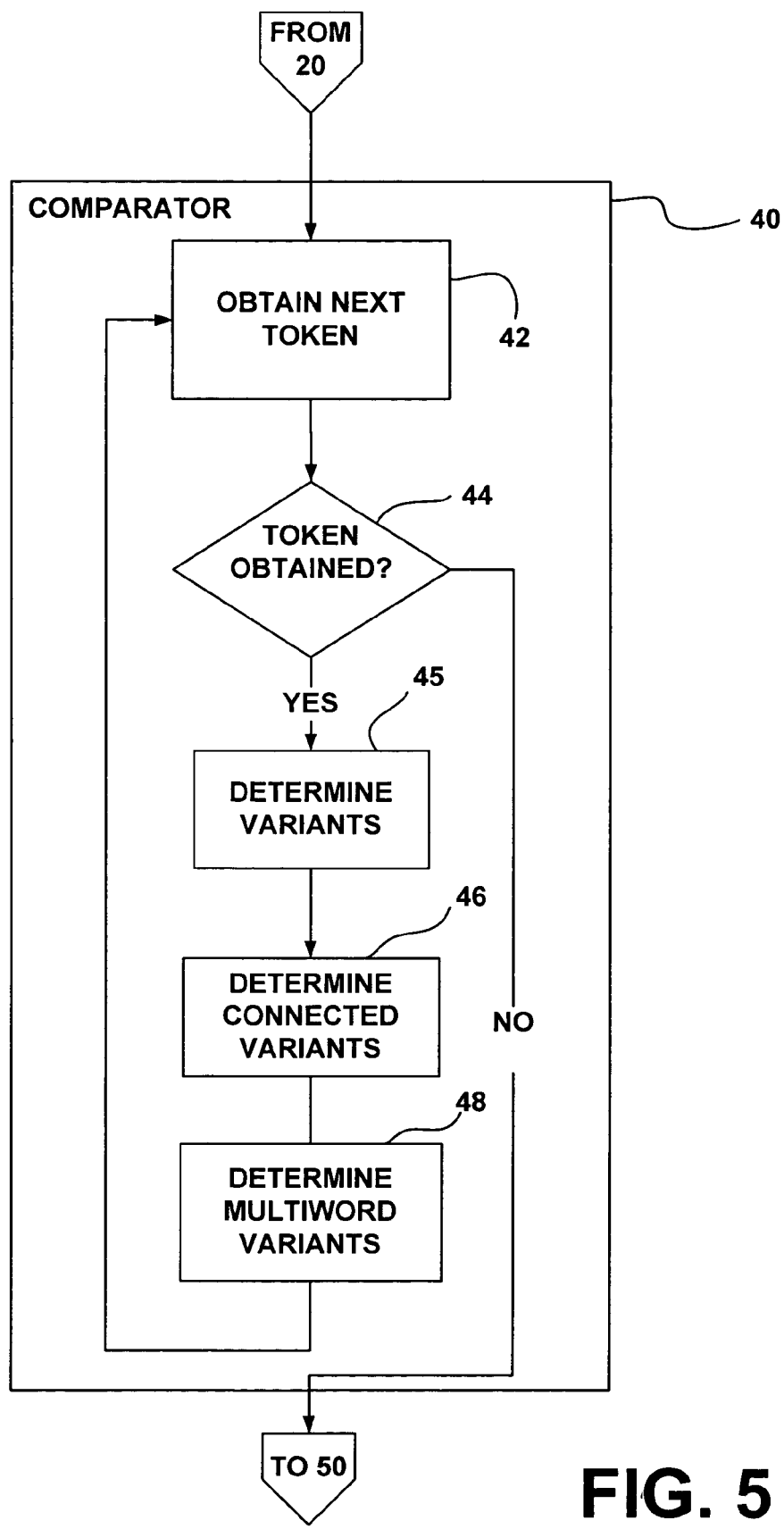
FIG. 5 shows a flow diagram of the steps that may be performed by the comparator 40, as shown in FIG. 1 according to one aspect of the present invention.

FIG. 5 shows a flow diagram of the steps performed by the comparator 40 as shown in FIG. 1 according to one aspect of the present invention. The comparator 40 may receive the token list from the featurizer 20. When the comparator 40 receives the token list the first token on the token list may be analyzed. The comparator 40 may be configured to obtain the next token from the token list, step 42. The decision block 44 indicates that if there are no further tokens left in the token list, then the tokenizer proceeds to the classifier stage 50. If a token is obtained, the program may proceed to determine variants of the token, step 45. This step of determining variants of the tokens may include, for example, looking for case and dressing variants of the specific token. This step may include looking for the particular token in all uppercase, in all lower case, and in mixed case within lexicon 41. Additionally, the step of determining variants may include looking for various dressing forms in the lexicon 41. In one embodiment of the present invention, all variations of a particular token are searched for within the lexicon 41. In one embodiment, all occurrences of a token variant that are found may be added to a candidate list, which may be stored in connection with the token structure. In one embodiment, each token has an LM token candidate list uniquely associated with the particular token.

After the step of determining variants has been completed, in one embodiment of the invention, the comparator 40 may be configured to perform a step of determining all connected variants of a particular token, step 46. The step of determining connected variants for a particular token 46 may include finding the particular token in a single string of characters uninterrupted by punctuation or white-space. For example, the input string "B12" is an example of a connected variant. The input token may be, for example, "B" with no termination following the token. In this case, the step of determining connected variants 46 may include looking for a "B" followed by characters. In one embodiment, where "B12" is included with the lexicon, a search for the token "B" may lead to no matches in the step of determining variants 45, but may turn up "B12" as a possible candidate in connection with the step of determining connected variants 46. The step of determining variants 46 may also include searching the lexicon 41 for variations in punctuation, such as, for example, hyphens that may occur in words. For example, continuing with the example in which the input string is "B12", the lexicon may include the candidate "B-12" which may also be added to the LM token candidate list in the step of determining connected variants 46.

After the step of determining connected variants 46 has been completed, the tokenizer 15, and more particularly, the comparator 40 may be configured to determine if there are any multi-word matches in the lexicon, step 48. In the step of determining multi-word variants 48, the comparator 40 may search for words that appear in the lexicon 41 in combination, separated by white-space. In yet another embodiment, comparator 40 may be configured to search for variants separated by punctuation, such as, for example, hyphens. For example, the word "United States" may appear in the lexicon. In a case in which the particular token in question is "United", the step of determining multi-word variants may include looking to the lexicon and placing the term "United States" in a LM token candidate list associated with the token "United". Additionally, other multi-word such as "United Center" may be placed in the LM token candidate list associated with the token "United".

FIGS. 6A and 6B are examples of several variants of how various input strings may be represented in a lexicon. The lexicon normally has just one spelling of "B12 Vitamin", but the code has to be flexible enough to find all the different variants. The word in the lexicon could be spelled with or without spaces, with different capitalization, with some tag such as "\:drug" to be used in other parts of the system, and with or without hyphens. The words in the document could have a different variation than the version in the lexicon.

Figure 7:
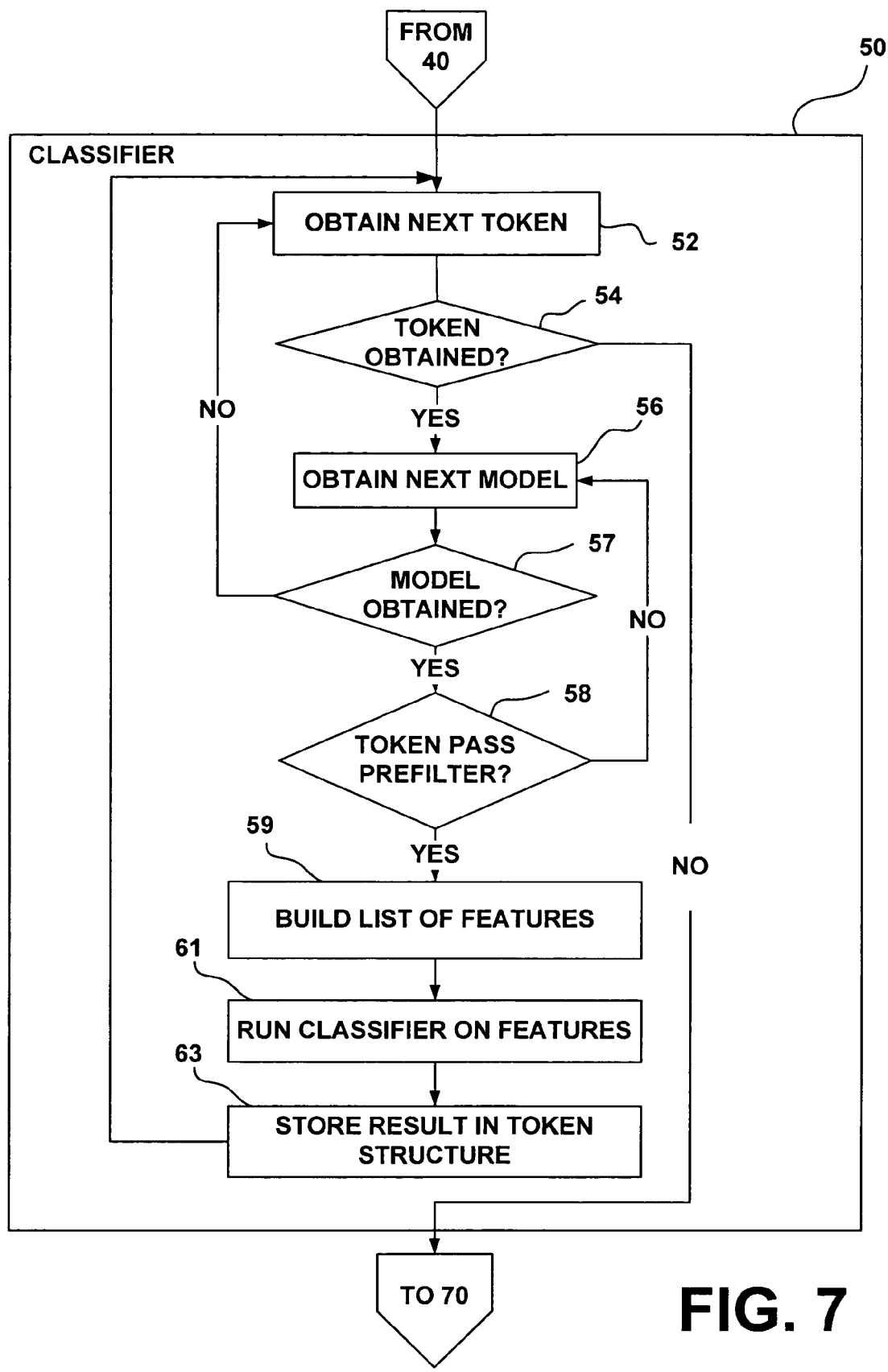
FIG. 7 shows a flow diagram of the steps that may be performed by the classifier 50, as shown in FIG. 1 according to one aspect of the present invention.

FIG. 7 shows a flow diagram of the steps performed by the classifier 50 as shown in FIG. 1 according to one aspect of the present invention. Specifically, the classifier 50 may receive the token list as an input. This token list may include tokens that include a LM token candidate list from the comparator 40. The classifier 50 may be configured to output classifications associated with particular tokens. Once determined, these classifications may be stored as part of the token structure. Any representation indicative of the classification of a particular token may be stored in association with the token structure. For example, if a particular token receives a classification, that classification may be stored as a unique classification identifier in the token structure. This unique classification identifier may be unique to the particular classification received by the token, and may be, for example, in the form of a number. Other classification identifiers such as, for example, alpha-numeric identifiers may be used.

When the classifier 50 receives the token list, the classifier 50 may obtain the next token in step 52. In the first iteration of the loop depicted in FIG. 7, this may mean that the first token is obtained from the token list received from the comparator 40. Following the step of obtaining a token, step 52, a determination may be made as to whether or not a token was available to be obtained from the token list. This decision is indicated by decision block 54. If no token was obtained, the loop may exit and the tokenizer 15 may input the token list into the finalizer 70. If a token was obtained, the next model may be retrieved, step 56. This will include looking to a list of initialized classifier models and obtaining a model from the list. Decision block 57 indicates that a determination may be made as to whether any models were obtained.

If a model is obtained, the token that is obtained is reviewed by the classifier 50 to see if the token passes the prefilter, step 58. If the token does not pass the prefilter, the next model may be obtained, as indicated by the loop back to step 56. The classifier 50 may continue reviewing the input tokens and making determinations of whether the token passes the prefilter, step 58, until one of two events occurs. The first event may be that all of the models have been applied. In this case, the determination indicated by decision block 57 returns a "no" and the classifier may loop back to retrieve the next token from the token list, performed in step 52. The second possible event is that the token under review passes the prefilter, as will be discussed in more detail below.

If the token passes the prefilter, as indicated by the decision block 58, a list of features may be built, step 59, based on the model that is being used. The configuration file that describes the models may indicate which relative token positions contribute to the set of features. The configuration file may also indicate what set of features are to be used from each of the relative token positions. A component called the feature formatter may use the configuration information to gather the indicated set of features from the indicated set of relative token positions. The feature formatter may read the required information from the relative token positions in the token list and store the information in the format required by the classifier.

Once the list of features has been built, step 59, the classifier may be run on the features as shown by step 61. By running the classifier 50 on the list of features, the tokenizer 15 may determine the probable pronunciation of a term or phrase given its context (e.g., whether "IV" was pronounced as "I V" or "four").

After the tokenizer 15 determines the correct classification for a given token, which is performed in the step of running the classifier 50 on the features, the tokenizer 15 may store the resulting classification in the token structure, as described above. In one embodiment of the present invention, the classification may be stored in the token structure using numbers. These numbers may be uniquely associated with the particular classification of the particular token. In yet another embodiment of the invention, the classification of the token may be stored in a file that is associated with the particular token. This association may be a reference to the token in the token structure. Alternatively, it may be stored in a relational database that may be accessed at a later time by the tokenizer or the speech recognition program.

After storing the classification in the token structure, the tokenizer 15, and more particularly, the classifier 50 may loop back to retrieve the next token. In one embodiment, the classifier 50 may stop when there are no remaining tokens on the token list. This is indicated by the exit illustrated in connection with decision block 54, when the decision results in a "no" answer.

The operation of the classifier 50 will now be described by way of example. This example is in no way intended to limit the invention to the described example. For example, while only three models are described in the example, any number of different models may be used in connection with the classifier 50 according to the invention.

In one example, the three models that may be used in connection with the classifier include (1) a model for classification of numbers; (2) a model for distinguishing the uses of MS for "Mississippi" and MS for "multiple sclerosis"; and (3) a model for distinguishing between IV for "intravenous" and IV for "four". In this example, assume that the token in question is "United". This token may be selected from the list of tokens. Therefore, decision block 54 will indicate that, yes, a token has been obtained. After determining a token was obtained, the classifier 50 will obtain the first model, step 56. The first model in this example is the model for the classification of numbers. Therefore, decision block 57 will indicate that a model has been obtained. However, upon reviewing the token "United" the classifier will realize that the token "United" does not include any numbers, and therefore, the token will not pass the prefilter. Therefore, the decision block 58 shows that the classification program will loop back and obtain the next model, step 56.

A model for the classification of numbers may be configured to classify numbers into ten, fifty, or more categories. Some exemplary categories for the classification of numbers may include, for example, systolic blood pressure, diastolic blood pressure, telephone area code, numbered list item, and ordinal. For example, a particular digit cluster may be classified as an area code. This classification may be passed to the token finalizer 70, which may be configured to determine how to turn that number into a series of tokens. The token finalizer 70 may be configured to determine that the series of digits "781" classified as an area code is likely to have been dictated as "seven eight one" whereas "781" as a test reading, for example, may have been dictated as "seven eighty one".

In this example, the second model distinguishes the different expansions of the abbreviation MS (i.e., to distinguish, for example, between "Mississippi" and "multiple sclerosis"). Because there is another model present, the loop will continue through decision block 57 and the classifier 50 will make a determination of whether the token "United" passes the prefilter. In this instance, the token "United" does not pass the prefilter for the MS classification model. Therefore, decision block 58 will once again return a "no", and will cause the classification program to loop back to obtain the next model, step 56.

The final model in this example is a model to distinguish between the use of IV to mean "intravenous" and the Roman numeral IV. Because there is another model, the loop will continue through decision block 57 and the classifier 50 will once again make a determination of whether the token "United" passes the prefilter for the IV model. Because the token "United" does not contain IV, the token for "United" does not pass the prefilter for the IV classification model. Therefore, decision block 58 will once again return a "no", and will cause the classification program to loop back to obtain the next model, step 56.

In this case, where there are only three models, decision block 57 may result in a determination that there are no additional models remaining. When there are no remaining models, the classifier 50 may loop back to obtain the next token, step 52. In this example, the next token may be "MS". After obtaining the next token, MS, the classifier 50 may make the determination that there was a token retrieved, as indicated by decision block 54. Next, the classifier 50 may obtain the next model, step 56. In this example, obtaining the next model, step 56, may include obtaining the model for classifying numbers. After a determination that a model is obtained as represented by decision block 57, the classifier 50 may review the token. After reviewing the token "MS", a determination may be made that the token does not pass the prefilter, decision block 58.

As before, if the classifier 50 determines that the token does not pass the prefilter, the program will loop back and obtain the next model, step 56. In this case, the next model may be the model for determining the proper classification for the abbreviation MS. The classifier may make a determination that a model was in fact retrieved, decision block 57, and may proceed to make a determination of whether or not the token passes the prefilter, decision block 58. In this case the token "MS" meets the requirements of the prefilter because it includes the abbreviation "MS" and therefore, the loop for obtaining the next model may be terminated. In one embodiment of the invention, no additional models are retrieved for this particular token.

The next step that the classifier 50 may go through is to build the features associated with the abbreviation "MS", step 59. The config file says for the MS model, for relative token positions from one before the target token to one after the target token, use features 1 (spelling), 2 (dressing), and 3 (termination). The feature formatter represents these 9 features as 9 text items in a list of features.

After the list of features has been built by the classifier 50, step 59, the classifier 50 may be run on the features, step 61. Running the classifier on the features, step 61, may allow the classifier to make a determination as to what the proper classification is for the abbreviation "MS". More specifically, the classifier may determine the answer to the question of whether the abbreviation "MS" means "Mississippi" or "multiple sclerosis", for example. The TiMBL package uses the contextual information as represented by the list of features, and uses the trained models to determine if this list of features is a better match with the "Mississippi" classification or the "multiple sclerosis" classification.

Once the classifier 50 is run on the features, step 61, and the correct classification of the token has been determined, the classifier 50 may store the result in the token structure as described above in detail. In one embodiment of the invention, the classification of the token may be stored, step 63, in numerical form in association with the token structure. After the classification of the token has been stored, step 63, the classifier 50 may loop back to obtain the next token 52. Once all of the tokens have been analyzed in connection with the appropriate classification models, a determination may be made that there are no more tokens, as indicated by the decision block 54, and the classifier may provide the token list to the finalizer 70.

Figure 8A:
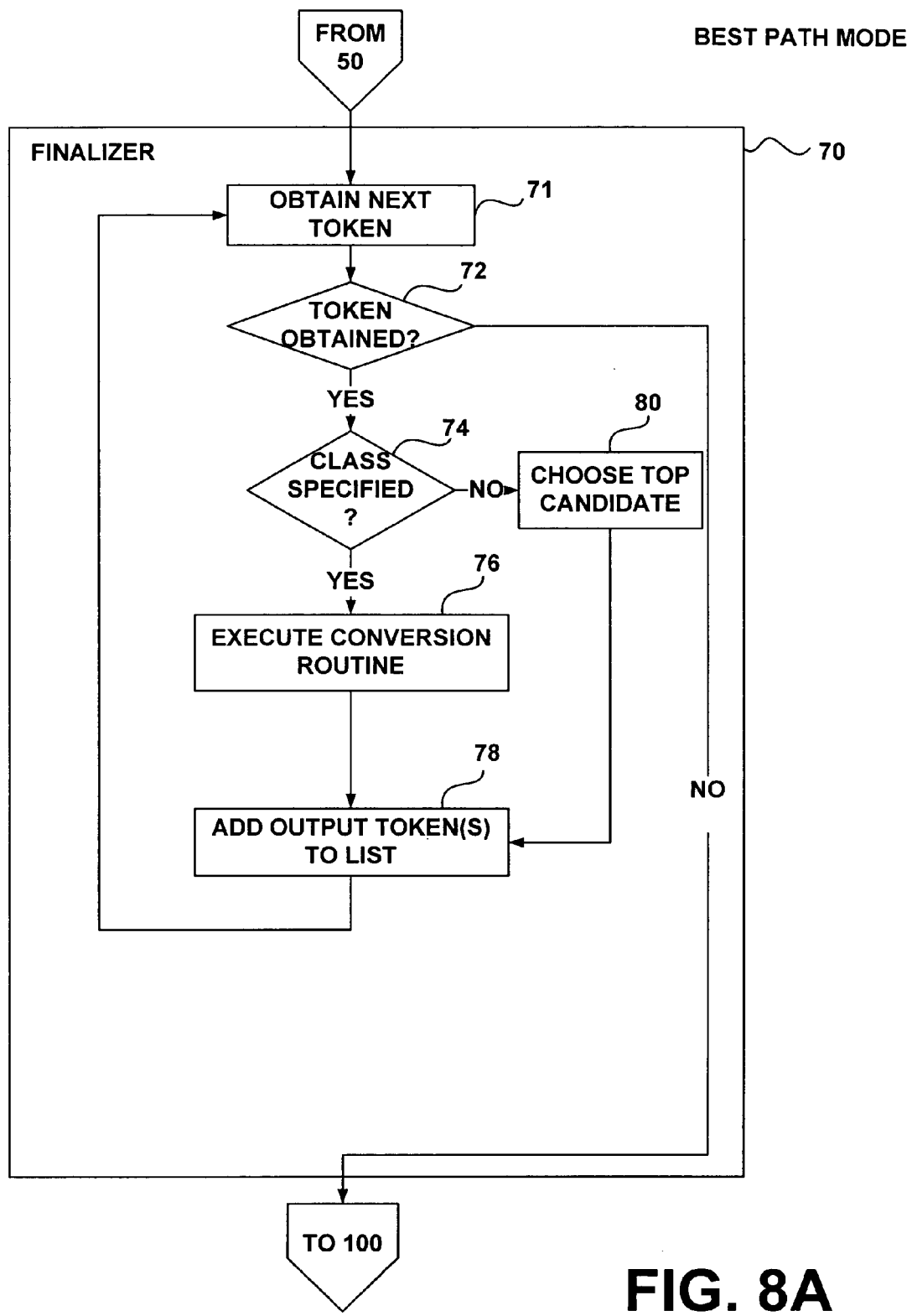
FIG. 8A shows a flow diagram of the steps that may be performed by the finalizer 70, as shown in FIG. 1 according to one aspect of the present invention in the Best Path Mode.
Figure 8B:
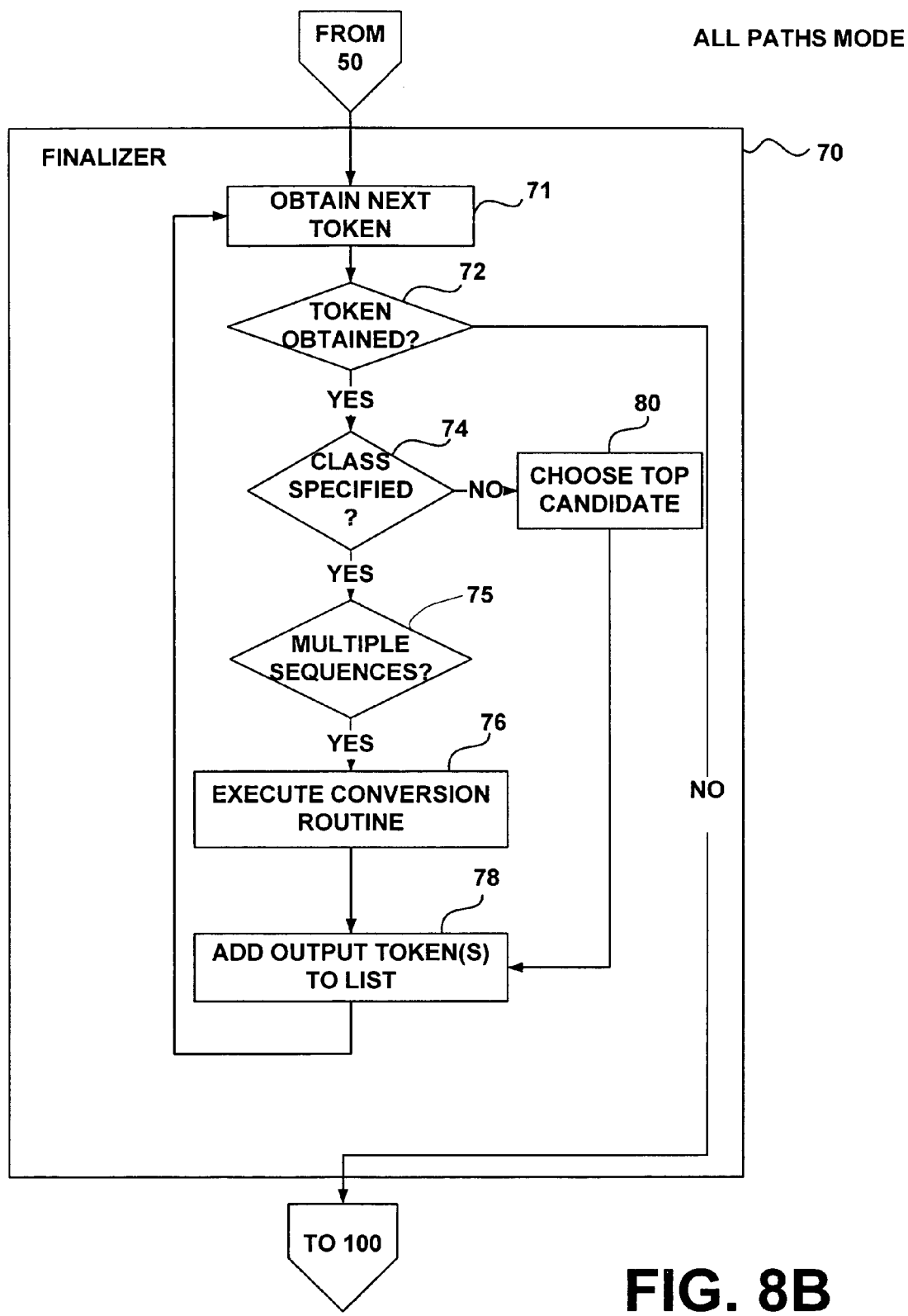
FIG. 8B shows a flow diagram of the steps that may be performed by the finalizer 70, as shown in FIG. 1 according to one aspect of the present invention in the All Paths Mode.

Various embodiments of algorithms that may be performed by the finalizer 70 are illustrated in FIGS. 8A-8C. The finalizer 70 may be one component of the tokenizer 15 that has language-dependent knowledge. Specifically, while the classifier code 50 may include language-independent knowledge, the models and/or finalizer 70 may have language-dependent knowledge. In some embodiments of the invention, language-dependent knowledge may be used to determine which classifier models are to be used to classify tokens. However, finalizer 70 may be configured to determine the various representations of the term "5" in different languages, for example.

FIG. 8A shows a flow diagram of the steps performed by finalizer 70 as shown in FIG. 1 according to one aspect of the present invention. This embodiment may be referred to as the Best Path Mode of operation of the finalizer 70. This Best Path Mode may be the simplest mode, algorithmically speaking. The finalizer 70 may be configured to receive the output of the classifier 50. As discussed above, the classifier 50 may output a token list including token structures that may include classification information. This token list may be received into the finalizer 70.

Finalizer 70 may include an algorithm that will obtain the next token, step 71, from the token list for further analysis and processing. A determination may be made as to whether or not the finalizer 70 is able to obtain a next token in step 71, as indicated by the decision block 72. If a token is not obtained, the finalizer 70 may be finished with processing and may exit. If, however, a token is obtained in step 71, a determination may be made as to whether the token structure of the obtained token includes a specified class, as indicated by decision block 74. If there is no class specified, as may be the case where the token does not pass the prefilter for any of the models being used in the classifier 50, then the algorithm may choose the top candidate, step 80. After the top candidate is chosen, the finalizer 70 may add the output token or tokens to the token list, step 78. Candidates may be stored in the token structure in the form of a set that is sorted in descending order of likelihood. The sorting algorithm may take into account the number of tokens matched by the candidate, the unigram frequency of the candidate, whether the candidate matches the token case-sensitively, and so on. For example, if one candidate represents a larger number of tokens than another, it wins. Else, if one candidate represents a case-sensitive match while the other does not, it wins. Else, if one candidate has a higher unigram frequency, it wins. Else, if one candidate is shorter in length, it wins. Else, if one candidate has a lower word ID, it wins. Else, if one candidate precedes the other in alphabetical order, it wins. Else, the candidates are considered identical. Alternatively, in best-paths mode the tokenizer may simply maintain the best candidate and discard the rest. In that case, when a new candidate is evaluated, it replaces the existing candidate if it is better than the existing candidate. Otherwise, the new candidate is discarded. If the classifier has indicated that the token belongs to a specific class, a conversion routine may be executed, step 76. A number conversion routine may involve conversion of a string of digits from the original text (e.g., "157") to a sequence of words (e.g., "one fifty seven"). An ambiguous-string conversion routine may involve replacement of an ambiguous string (e.g., "FL") by a string that better represents the original pronunciation (e.g., "Florida"). In either case, the output sequence of words may be converted to a sequence of output tokens. After the conversion routine has been performed, step 76, the output tokens may be added to the token list, step 78, as described above.

The finalizer 70 may then loop back to obtain the next token from the token list, step 71. The finalizer 70 algorithm may then repeat this loop until there are no more tokens obtained.

FIG. 8B shows a flow diagram of the steps performed by finalizer 70, according to one aspect of the present invention in the All Paths Mode. Finalizer 70, operating in All Paths Mode may be similar to the finalizer 70 operating in Best Path Mode, illustrated in FIG. 8A. However, whereas in Best Paths Mode the finalizer 70 proceeds from token to token, in All Paths Mode, the finalizer 70 begins by identifying a chunk. A chunk is defined as the smallest sequence of tokens such that no candidate for any MBLToken in the series refers to an MBLToken that extends beyond the sequence. For instance, if the text contained the sequence "New York City is" and the MBLToken associated with the input word "New" contained (among other candidates) the candidate "New York City [token 1 of 3]", then neither "New" nor "New York" would be a chunk. By contrast, "New York City" would be a chunk because it would contain no candidates that would extend beyond "City". "New York City is" would not be a chunk because it would violate the "smallest sequence of tokens" criterion. Finalizer 70 of FIG. 8B may include an algorithm that will obtain the next chunk, step 71, from the token list for further analysis and processing. A determination may be made as to whether or not the finalizer 70 is able to obtain the next chunk in step 71, as indicated by the decision block 72. If a chunk is not obtained, the finalizer has completed its task and exits. If a chunk is obtained in step 71, and if the chunk consists of only a single MBLToken, a determination may be made as to whether the token structure includes a specified class, as indicated by decision block 74. If there is no class specified, as may be the case where the token does not pass the prefilter for any of the models being used in the classifier 50, then the algorithm may proceed to call All_Paths_Unclassified, step 80, diagrammed in detail in FIG. 8C. Otherwise, the algorithm may proceed to call All_Paths_Classified, step 76, diagrammed in detail in FIG. 8D. Both FIG. 8C and FIG. 8D are discussed separately below. After All_Paths_Unclassified or All_Paths_Classified is called, the output sequences, called hypothesis paths, are added to the output token list, step 100.

Note that, unlike in Best Path Mode, there may be multiple alternative output sequences corresponding to a single chunk, and the sequences may be tagged to indicate the beginning and end of a list of alternative sequences.

In All_Paths_Unclassified, FIG. 8C, the algorithm proceeds by building a list of "hypothesis paths" as it proceeds on a token-by-token basis through a chunk. A hypothesis path is a sequence of LM tokens that represents a possible tokenization of the chunk thus far. As each token is considered, each existing hypothesis path is examined to determine whether the current token may be appended to it. If the token may be correctly appended, a new hypothesis path consisting of the old hypothesis path with the token appended is added to the list. The old hypothesis path is allowed to remain in the list as a basis for new hypothesis paths until just prior to writing out the chunk. The algorithm begins at step 81 by appending an empty hypothesis path to the list. The next token in the chunk (which on the first iteration is the first token in the chunk) is obtained at step 82. If a token is obtained, the next hypothesis path in the list (which on the first iteration is the first hypothesis path in the list) is obtained at step 85. If a hypothesis path is obtained, the determination is made at decision block 86 whether the hypothesis path may be extended. If the answer is affirmative, the existing hypothesis path is cloned 87, extended 88, and appended to the list 89. After these steps (which are omitted if the hypothesis path cannot be extended), the algorithm returns to step 84. The loop continues until no more hypothesis paths may be obtained at step 85. At this point, the algorithm returns to step 82 and another token is obtained. When no more tokens exist in the chunk, the algorithm proceeds to step 90. The first hypothesis path is obtained. If this hypothesis path is valid (containing the correct number of MBLTokens), the first and last MBLTokens (which may be the same) are tagged and appended to the final output from the tokenizer 94. If the hypothesis path is invalid (containing an incorrect number of MBLTokens), it is deleted 93. In either case, the next hypothesis path is obtained. This loop proceeds until all hypothesis paths have been obtained. At this point, the hypothesis path list is sorted according to an algorithm that involves a cumulative score calculated from the scores of the individual candidates comprising each hypothesis path. If the number of hypothesis paths for the chunk exceeds N, the maximum number of hypothesis paths specified in the initialization file, only the best N hypothesis paths are retained. In All_Paths_Classified, FIG. 8D, the algorithm tokenizes a single classified token by building a set of string "deques" (double-ended queues) each of which represents a "hypothesis path" or possible tokenization. The algorithm proceeds by choosing the appropriate converter for the class. At 101, the determination is made whether an "option batch" is defined for the class. This consists of a set of values determining characteristics of the tokenization. For instance, one set may consist of one value that stipulates that "one" before "hundred" or "thousand" should be replaced by "a", one value that stipulates that "and" should be inserted after "hundred", and a third value that stipulates that "zero" should be replaced by "oh". Another "option batch" might consist of a set of values identical to the first except that it would contain a value stipulating that "zero" should not be replaced by "oh". Option batches are numbered so that it is possible to cycle through a set to generate each possible set of options. If no option batches are defined, the algorithm proceeds immediately to 104, where the conversion is performed. Otherwise, the first option batch is obtained prior to proceeding to 104. The converted sequence is inserted into the string deque set. If the sequence is identical to one that has been stored previously, it will be ignored. If no option batches are defined, the algorithm proceeds immediately to step 107. Otherwise, option batches are obtained successively and conversions are performed, and only when no more option batches can be obtained does the algorithm proceed to step 107. From steps 107 through 110, the algorithm proceeds by writing out the set of string deques. Once the set is exhausted, the algorithm proceeds to step 71.

Best-Paths Mode may be used in automatic language model identification and in language model adaptation, where tokenization with statistics that fairly accurately model input dictation is desired. All-Paths Mode may be used in text selection by voice, where it is desirable to anticipate all ways a user might dictate a section of text to be selected. However, if All-Paths Mode were used to generate a statistical model, the presence of the less frequent paths would distort the statistics, with degraded results. Similarly, if Best-Paths Mode were used in voice selection, the system might be unable to choose the selection corresponding to the phrase dictated by the user. Coin-Toss Mode might be used in place of Best-Paths Mode, but the gain in accuracy might not justify the increase in complexity and in execution time.

Coin-Toss Mode behaves internally like All-Paths Mode except that the score assigned to each path is used along with a number generated by a randomizer to determine which of the paths is selected. Thus, the tokenization of a given string may differ from one instance to the next if there are a variety of ways that it could have been dictated. In terms of output, however, Coin-Toss Mode is like Best-Path Mode in that only a single path is generated. The advantage of Coin-Toss Mode over Best-Path Mode is that it may generate tokenization whose statistical behavior is closer to that of actual dictated text. For instance, in a theoretical example, 75% of speakers might dictate "157" as "a hundred and fifty seven" while the other 25% might dictate it as "one hundred fifty seven". By always choosing the Best-Paths Mode tokenization, "a hundred and fifty seven", the statistics would fail to take into account the "one hundred fifty seven" pronunciation.

Figure 9A:
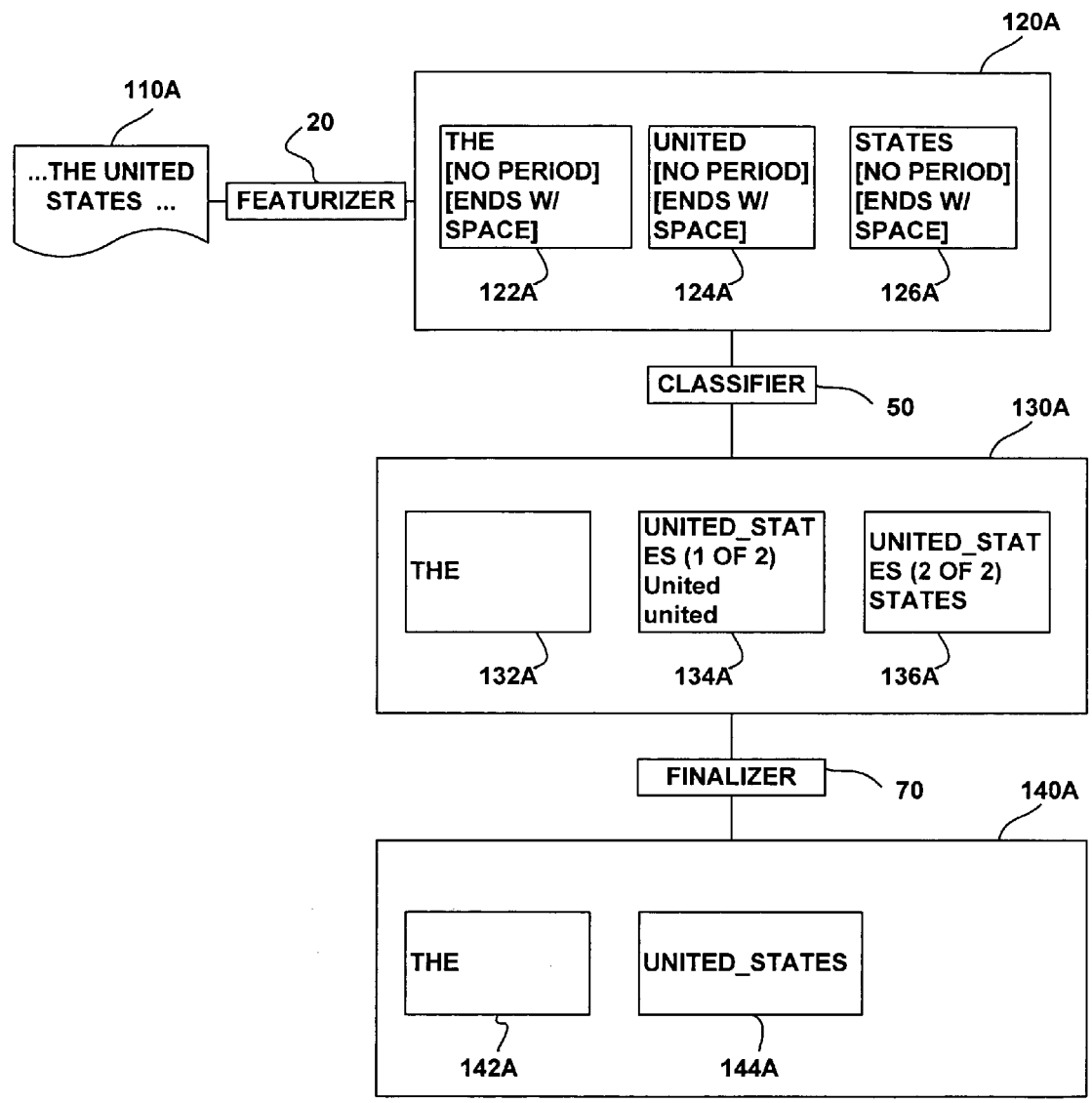
FIG. 9A is a diagram example of the system and method according to one aspect of the present invention as applied to the phrase "United States"

FIG. 9A shows an example of the tokenizer applied to a multi-word according to an exemplary embodiment of the invention. The example illustrated in FIG. 9A, the input text may include the input text "the United States", 110A. The words "the United States" may be the entire input string, or a portion of the total input text. The input text "the United States" may then input into the featurizer 20. After being processed in the featurizer 20, which is described in detail above, with reference to FIG. 2, the Featurizer may create a list of tokens 120A.

This token list may include, for example, three tokens, including the token structures represented by token structures 122A, 124A and 126A. As shown in FIG. 9A, the first token in the token list 120A may include the base string "the", 122A, which may have an indicator or indicators in the token structure that indicate that the token does not include a period and that it ends with a space. These indicators may describe the attributes of the tokens. The next token may include, for example, the word "United", which as may be indicated in the token structure 124A, have a capital 'U', have no period, and end with a space, as illustrated in FIG. 9A. The final token in the example illustrated in FIG. 9A may include the base string "States" 126A which has a capital 'S', has no period, and ends with a space.

After this list of tokens and the associated token structures has been produced, the list may be passed to the classifier 50. By passing the token list 120A through the classifier 30, the list 130A may be produced. The tokens 132A, 134A, and 136A in the token list 130A may include a set of zero or more token candidates. Each set may be configured to be sorted as a new candidate is added. In one embodiment of the invention, the candidates may be sorted each time a new candidate is added to the list.

In the embodiment illustrated in FIG. 9A, the first token in the token list 130A includes the word "the", 132A. For the word "the" there is only one candidate, as illustrated in FIG. 9A, 132A. The next token in the list 130A includes the word "United", 134A. This token 134A may include three candidates, as illustrated in FIG. 9A. The first candidate is "United States" and may include the indication that the word "United" is the first word of a two-piece multi-word in the term "United States". The second candidate may include the word "United", with a capital 'U'. The third candidate may include the work "united", with a lowercase 'u'.

The third token in the token list 130A may include a third candidate list. This candidate list is indicated by box 136A. The first candidate in the candidate list 136A may include the candidate "United States" (2 of 2), to indicate that the token "States" is the second part of the two-part multi-word "United States". The second candidate may include the word "states", with a lower case 's'. In the example, shown in FIG. 9A, the lexicon does not include the word "States" with a capital 'S'. If the lexicon did include the word "States" with a capital 'S', then the candidate "States" with a capital 'S' might appear before the lower case version of the candidate "states", as will be discussed below in more detail.

After the candidate lists 132A, 134A, and 136A have been compiled, these lists may be input into the token finalizer 70. The token finalizer 70 may be configured to produce the list shown in FIG. 9A as list 140A. In one embodiment of the invention, the token finalizer 70 may process the list 142A and determine that there is a single candidate. Thus, the list 142A may become the final token as there is only one candidate. Reviewing the next list of candidates, 144A, the finalizer 70 may be configured to determine that the best token in the candidate list is the token "United_States". The finalizer 70 may select this token as the output token. This may consume the final token "States" as the output is a multi-word that includes the token "States". In this example, there were fewer output tokens than input tokens. There are examples, however, in which there are more output tokens than input tokens. This may occur, for example, in the case of numbers, as will be described with respect to FIG. 9C.

As discussed above, the list of candidates may be sorted each time a new candidate is added to the list. Alternatively, the candidate list may be sorted after the entire candidate list has been populated. This sorting process may be performed by an algorithm. In one embodiment of the invention, the algorithm may be configured such that the largest multi-word is placed at the top of the candidate list. This principle is shown in FIG. 9A, box 134A, where the multi-word "United_States" appears before any of the single word candidates. In an alternative embodiment, if the candidate list includes the multi-word "United_States_of America", this multi-word may appear before the multi-word "United_States" in the candidate list 134A for the token "United". The algorithm may also be configured to place single words with exact case matches prior to candidates with non-matching case. Therefore, in the example shown in FIG. 9A, the candidate "United" with a capital 'U' may appear before the candidate "united" with a lower case 'u'.

The aforementioned algorithm may provide various benefits when used in connection with the tokenizer 15 of the present invention. For example, the deterministic algorithm may result in a more efficient tokenization process, because the candidate list for a particular token does not need to be reviewed to determine which candidate is most likely to match the original pronunciation; that "best" candidate will always be at the top of the list.

Figure 9B:
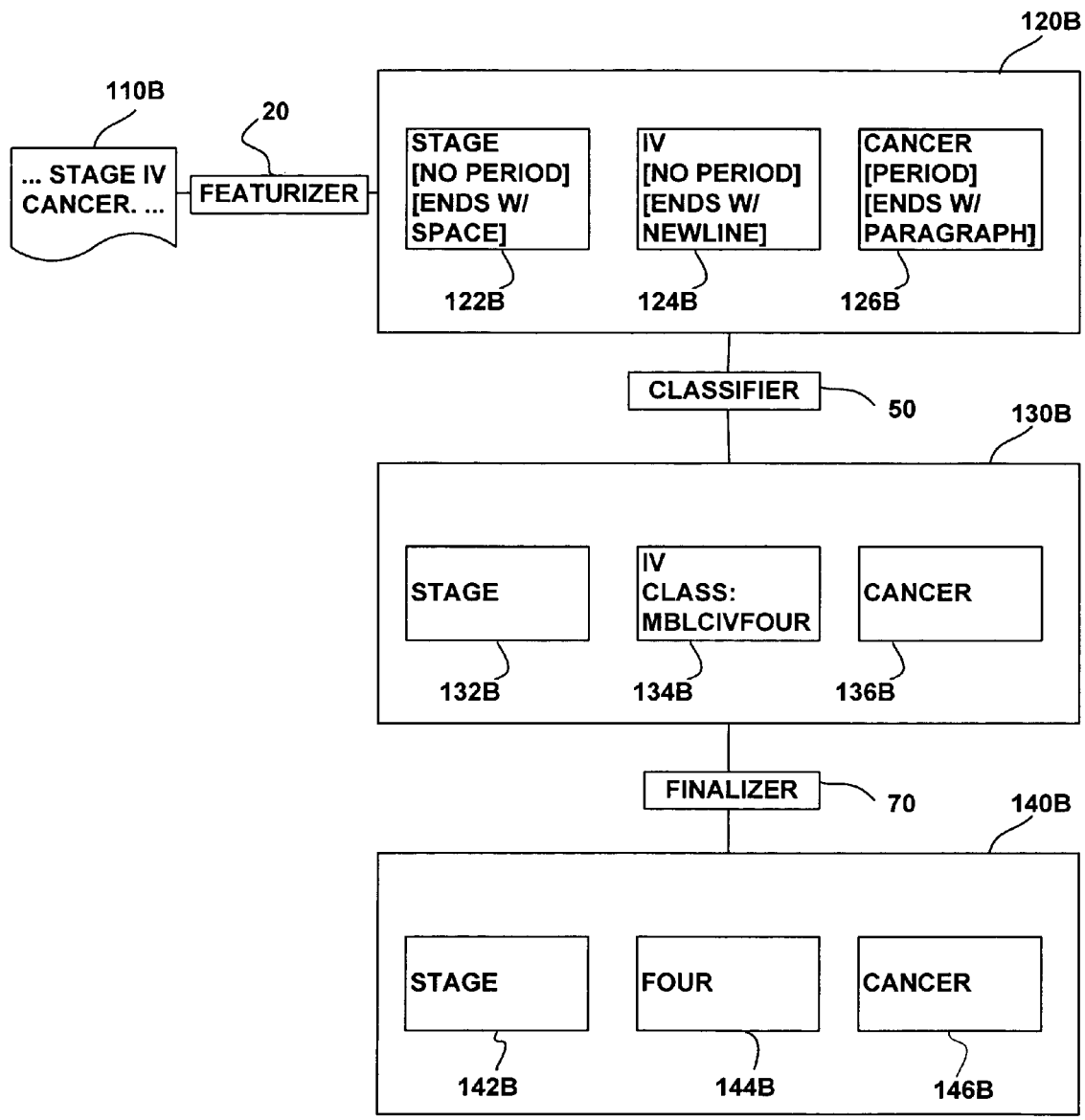
FIG. 9B is a diagram example of the system and method according to one aspect of the present invention as applied to the ambiguous string "IV"

In the example illustrated in FIG. 9B, the input text may include the text "stage IV cancer", 110B. This input text 10B may then be input into the featurizer 20. The Featurizer 20 may be configured to produce the token list 120B, including tokens 122B, 124B and 126B, as illustrated in FIG. 9B. Token 122B may include the base string "stage" and include the fact that the word is not followed by a period, but is followed by a space. This information may be stored in the token structure associated with the base string "stage". The second token 124B may contain the string "IV". In the example illustrated in FIG. 9B, the string "IV" is not followed by a period and ends with a new line. The string "IV" may not necessarily end in a new line, and may in fact end in a number of different ways including a space or new paragraph. In this example, however, the base string "IV" ends with a new line. This fact may be reflected in the token structure associated with the base string "IV". The final token 126B includes the base string "cancer." In the example shown in FIG. 9B, token 126B ends with a period and marks the end of the paragraph. This information may be reflected in the token structure associated with the base string "cancer."

The list 120B may then be input into the classifier 50. The classifier 50 may output list 130B. In the example illustrated in FIG. 9B, the first token output from the classifier 50 is the word "stage", 132B. As shown, the word "stage" may only include a single candidate, as reflected by the candidate list 132B. The second token output from the classifier 50 may be associated with the input string "IV". In one embodiment of the invention, classifier 50 may include a classification model to classify the input string "IV". Thus the classifier 50 may determine that "IV" belongs to a predetermined classification. This predetermined classification is indicated by "MBL-C_IV_Four" in FIG. 9B, 134B. This means that the representation of the input string is "IV" and the meaning is "four." The third base string in the sequence is the word "cancer," which may include only one candidate in the candidate list 136B.

After each of the candidate lists have been populated and the classification models have been run on the input text 10, the list 130B may be input into the finalizer 70. Finalizer 70 may output the list illustrated in FIG. 9B as list 140B. The first output token may be the output token "stage", 142. The second output token is the word "four", 144B. The final output token includes the word "cancer", 146B.

Figure 9C:
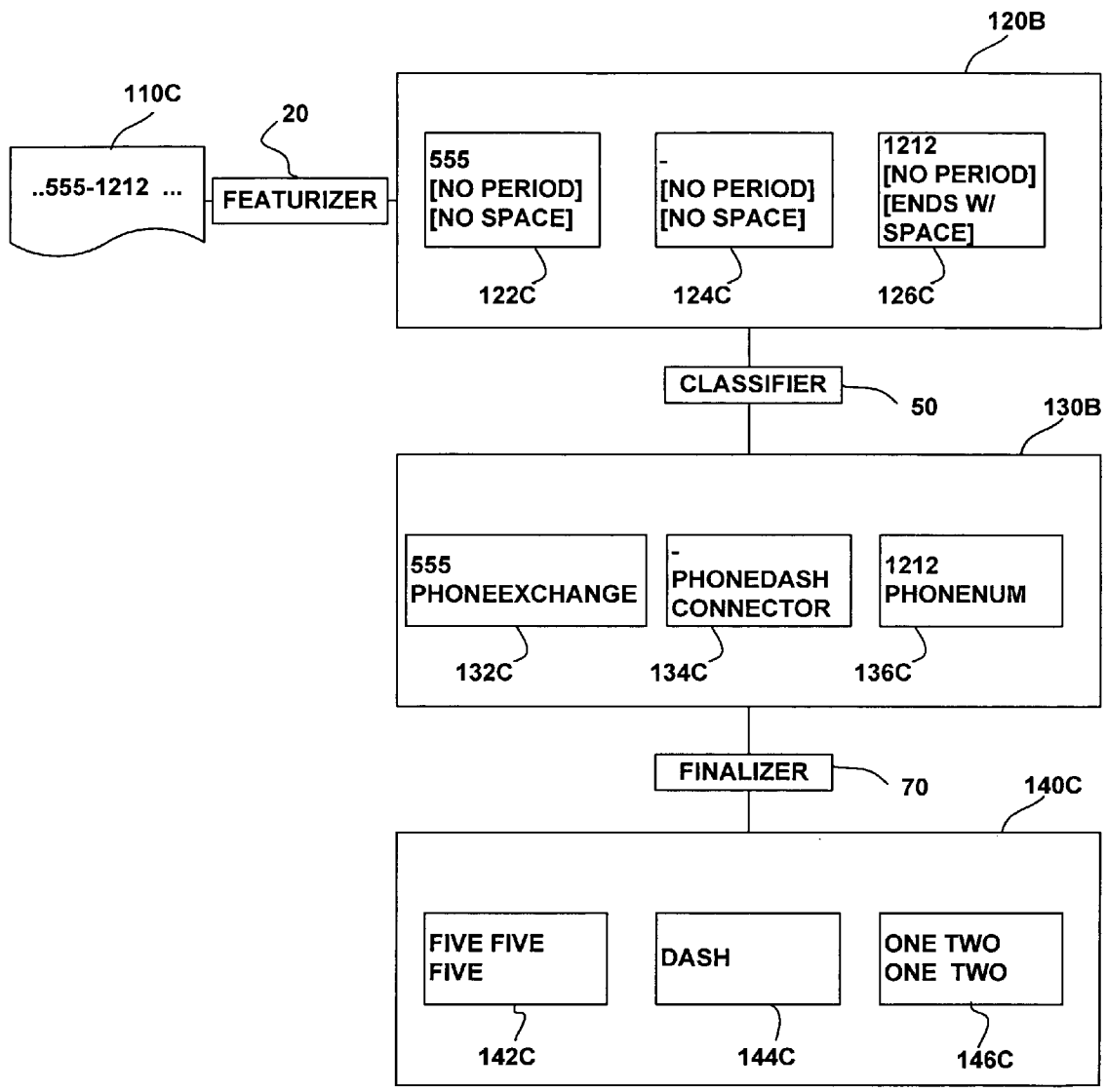
FIG. 9C is a diagram example of the system and method according to one aspect of the present invention as applied to a telephone number.

FIG. 9C shows an example of the tokenizer 15 applied to a number as the input string. In the example illustrated in FIG. 9C, the input number is "555-1212". The input text 110C is input into the featurizer 20 as described above. The featurizer 20 is configured to output the token list 120C, which includes tokens 122C, 124C and 126C. The first token 122C includes the string "555", which is not followed by a period or a space. The second token 124C shows a hyphen, or more specifically, includes the string '-'. The third token, 126C includes the string "1212".

This token list 120C is then input into the classifier 50. The classifier 50 may be configured to produce a list 130C. The first token in the list 132C is "555", which may receive the classification of a telephone exchange from the classifier 50. The second token, the hyphen, may receive the classification "phone dash connector" merely because of its position following a telephone exchange. The final token 136C in the token list 130C may include the string "1212" which has been classified by the classifier 50 as a phone number.

The token list, including the classifications and the candidates stored, for example, in association with the token structure 132C, 134C and 136C, may then be passed to the token finalizer 70. The finalizer 70 may take the token associated with the input string "555" and may convert this into a series of three output tokens, each being a five, as illustrated in box 142C, FIG. 9C. The hyphen may be converted to the output token "dash" as illustrated by box 144C, FIG. 9C. Finally the input string "1212" may be converted into four output tokens, such that the output associated with the input string is "one two one two", each number being a separate token. In this example, the finalizer 70 may include a set of instructions that requires phone numbers to always be output as a series of spelled-out numbers rather than digits. Furthermore, the finalizer 70 may also include a set of instructions to output the hyphen in the phone number as the spelled-out word "dash".

Numerous other manipulations of the data may be performed subsequent to the tokenization of the text by post-processing. It will be apparent to one of skill in the art that described herein is a novel system and method for automatic tokenization. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A non-transitory computer readable storage medium encoded with processor-readable code that, when executed, implements:
   a featurizer that transforms input text into a plurality of token structures each comprising a token and attributes corresponding to said token, the token being a smallest meaningful unit of text;
   a comparator that receives said token structures from said featurizer and performs a comparison of each token structure of said plurality of token structures to at least one language model lexicon to determine if said at least one language model lexicon contains said token structure and, if so, adds said token structure to a candidate list associated with the token structure;
   a classifier that receives said plurality of token structures from said comparator, said classifier operatively configured to determine, for each token structure in the plurality of token structures, if a classifier model from a list of available classifier models is suitable for the token structure and, if so, to apply said token structure to said suitable classifier model to determine classification information and to store the determined classification information in the token structure; and
   a finalizer that receives said plurality of token structures from said classifier and candidate lists associated with said plurality of token structures, said finalizer being configured to, for each token structure in the plurality of token structures:
      determine if said token structure includes classification information;
      convert the text associated with the respective token of the token structure according to the classification information if the token structure includes classification information and output a converted token structure with the converted text to an output token list; and
      select a top candidate token structure from the candidate list associated with the token structure if the token structure does not include classification information and output said top candidate token structure to the output token list.

2. The computer readable storage medium according to claim 1, wherein at least one token comprises only one type of character selected from the group consisting of letters, numbers, and punctuation.

3. The computer readable storage medium according to claim 1, wherein said classifier determines said suitable classifier model by sequentially applying said token structure to a series of prefilters, each said prefilter corresponding to one of said classifier models available from said list of classifier models.

4. The computer readable medium of claim 1, wherein the comparator further determines a plurality of token variants of at least one token structure of the plurality of token structures, the plurality of token variants describing a respective plurality of variations of formats of text associated with the respective at least one token structure.

5. The computer readable medium according to claim 4, wherein the comparator further performs a comparison of each of the plurality of token variants of the at least one token structure to the at least one language model lexicon to determine if the at least one language model lexicon contains said token variants of said token structure, and when a token variant of the plurality of token variants is found in the language model lexicon, the comparator further adds said token variant to the candidate list associated with the token structure.

6. A method for tokenizing text, the method comprising:
   receiving input text by a featurizer that transforms said input text into a plurality of token structures each comprising a token and attributes corresponding to said token, the token being a smallest meaningful unit of text;
   providing said plurality of token structures to a comparator that performs a comparison of each token structure of said plurality of token structures to at least one language model lexicon to determine if said at least one language model lexicon contains said token structure and, if so, adds said token structure to a candidate list associated with the token structure;
   providing the plurality of token structures to a classifier that determines, for each token structure of the plurality of token structures, if a classifier model from a list of available classifier models is suitable for the token structure and, if so, applying said token structure to said suitable classifier model to determine classification information and storing the determined classification information in the token structure; and
   providing the plurality of token structures to a finalizer that, for each token structure in the plurality of token structures:
      determines if said token structure includes classification information;
      converts the text associated with the respective token of the token structure according to the classification information if the token structure includes classification information and outputs a converted token structure with the converted text to an output token list; and
      selects a top candidate token structure from the candidate list associated with the token structure if the token structure does not include classification information and outputs said top candidate token structure to the output token list.

7. The method according to claim 6, where the tokens include only one type of character selected from the group consisting of letters, numbers, and punctuation.

8. The method according to claim 6, wherein said classifier determines said suitable classifier model by sequentially applying said token structure to a series of prefilters, each said prefilter corresponding to one of said classifier models available from said list of classifier models.

9. The method according to claim 6, where the token comprises a set of characters.

10. The method of claim 6, wherein the method further comprises, by the comparator, determining a plurality of token variants of at least one token structure of the plurality of token structures, the plurality of token variants describing a respective plurality of variations of formats of text associated with the respective at least one token structure.

11. The method according to claim 10, wherein the method further comprises, by the comparator, performing a comparison of each of the plurality of token variants of the at least one token structure to the at least one language model lexicon to determine if the at least one language model lexicon contains said token variants of said token structure, and when a token variant of the plurality of token variants is found in the language model lexicon, adding said token variant to the candidate list associated with the token structure.

12. A non-transitory computer readable storage medium encoded with computer executable instructions coded to:
  receive input text;
  transform the input text into a plurality of token structures each comprising a token and attributes corresponding to said token, the token being a smallest meaningful unit of text;
  perform a comparison of each token structure of said plurality of token structures to at least one language model lexicon to determine if said at least one language model lexicon contains said token structure and, if so, add said token structure to a candidate list associated with the token structure;
  determine, for each token structure of the plurality of token structures, if a classifier model from a list of classifier models is suitable for the token structure and, if so, apply said token structure to said suitable classifier model to determine classification information and store the determined classification information in the token structure;
  provide the plurality of token structures to a finalizer that, for each token structure in the plurality of token structures:
    determines if said token structure comprises classification information;
    converts the text associated with the respective token of the token structure according to the classification information if the token structure includes classification information and outputs a converted token structure with the converted text to an output token list; and
    selects a top candidate token structure from the candidate list associated with the token structure if the token structure does not include classification information and outputs said top candidate token structure to the output token list.

13. The computer readable storage medium of claim 12, wherein the computer readable medium is further encoded with computer executable instructions coded to determine a plurality of token variants of at least one token structure of the plurality of token structures, the plurality of token variants describing a respective plurality of variations of formats of text associated with the respective at least one token structure.

14. The computer readable medium according to claim 13, wherein the computer readable medium is further encoded with computer executable instructions coded to perform a comparison of token variants of the at least one token structure to the at least one language model lexicon to determine if the at least one language model lexicon contains said token variants of said token structure, and when a token variant of the plurality of token variants is found in the language model lexicon, add said token variant to the candidate list associated with the token structure.

* * * * *